3,317,301
METHOD OF AND APPARATUS FOR THE MANU-
FACTURE OF FLAT GLASS ON A MOLTEN
METAL BATH
Albert Sidney Robinson, Birkdale, Southport, England,
assignor to Pilkington Brothers Limited, Liverpool, England, a corporation of Great Britain
Filed July 29, 1963, Ser. No. 298,045
Claims priority, application Great Britain, Aug. 3, 1962,
30,073/62
6 Claims. (Cl. 65—99)

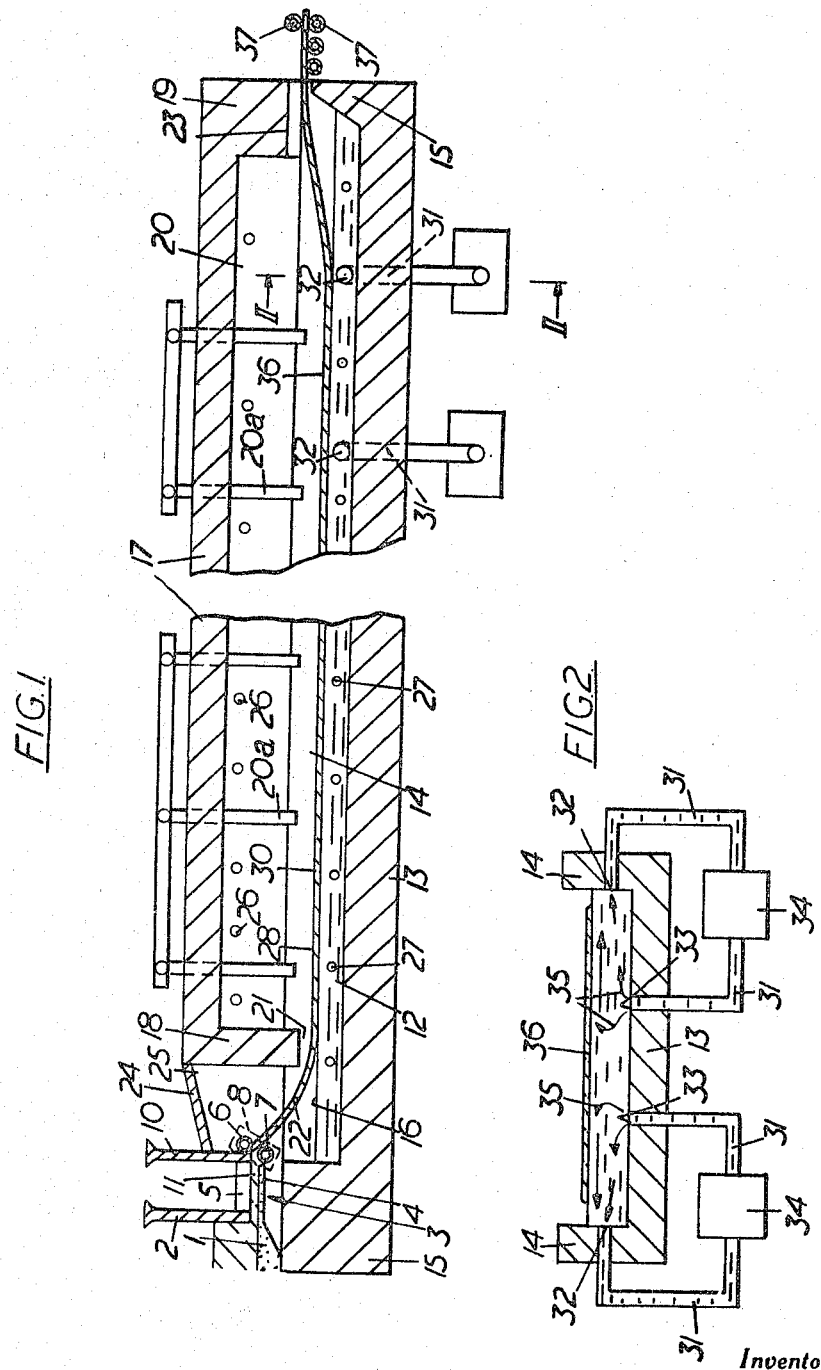

This invention relates to the manufacture of flat glass.

In the manufacture of flat glass in which glass is in contact with a molten metal, for example a method in which flat glass is manufactured in ribbon form on a bath of molten tin or tin alloy, a plenum of protective atmosphere is maintained over the molten metal in order to protect it. The molten metal with which the glass is in contact is such as to have all the characteristics as fully described in U.S. Patent No. 2,911,759 for the molten bath.

However, the molten metal may be subjected to contamination from traces of oxygen and sulphur which find their way into the protective atmosphere and which lead to reactions with the molten metal to produce contaminants for the glass.

It is a main object of the present invention to provide an improved method of manufacturing flat glass during which glass is in contact with molten metal.

According to the present invention there is provided a method of manufacturing flat glass during which glass is in contact with molten metal, characterised by causing the molten metal to well upwardly underneath the glass, whereby a continuously renewed molten metal surface is presented to the glass.

In a preferred method, the flat glass is manufactured in ribbon form on a bath of molten metal and a plenum of protective atmosphere is maintained in the headspace over the bath. In addition to contamination from traces of oxygen and sulphur which find their way into the headspace and which may react with the metal of the bath contaminants may also be formed in the bath when traces of oxygen and sulphur, for example, enter the surface of the bath from the underface of the ribbon of glass.

According to this aspect, the invention provides a method of manufacturing flat glass in ribbon form in which method glass in ribbon form is advanced along a bath of molten metal, characterised by causing molten metal in the bath to well upwardly to the surface of the bath underneath the ribbon of glass in the region where the ribbon is sufficiently stiff to hold its shape, whereby a continuously renewed molten metal surface is presented to the glass in said region.

It has been found to be advantageous to provide a continuously renewed molten metal surface in contact with the glass as the glass leaves the bath surface. From this aspect the invention comprehends a method of manufacturing flat glass in ribbon form on a bath of molten metal in which method glass in ribbon form is advanced along the bath and is taken off the bath through an outlet from the bath, characterised by causing molten metal in the bath to well upwardly to the surface of the bath underneath the ribbon of glass in the region where the ribbon of glass leaves the surface of the bath and then to flow under the ribbon to cause the ribbon, just before it leaves the bath, to be supported on a continuously renewed molten metal surface.

Conveniently, the molten metal which wells to the surface of the bath underneath the ribbon of glass in the said region is caused to flow under the ribbon transversely of the direction of movement of the ribbon.

When the molten metal which has welled to the surface of the bath underneath the ribbon is caused to flow transversely of the ribbon, it moves from beneath the ribbon any contaminants for the glass which may be present at the interface between the glass and the molten metal of the bath. When such contaminants are present, these appear as a scum or dross on the exposed surface of the bath at the side of the glass ribbon. Preferably these contaminants are removed from the bath as they flow from underneath the glass ribbon towards the side of the bath.

According to this aspect, therefore, the present invention provides a method of manufacturing flat glass in ribbon form on a bath of molten metal, wherein glass in ribbon form is advanced along the bath of molten metal, characterised by presenting a continuously renewed molten metal surface to the glass in the region where the ribbon of glass leaves the surface of the bath by causing molten metal in the bath to well upwardly to the surface of the bath underneath the ribbon in the said region, then causing the molten metal to flow under the ribbon transversely of the direction of movement of the ribbon and so to move from under the ribbon any contaminants for the glass, and continuously removing from the bath contaminants which are moved transversely from beneath the glass ribbon.

The contaminants or dross may be removed from the molten metal at the side of the ribbon in any convenient manner, for example by manually operated mechanical means.

Advantageously, however, the tank structure which contains the bath of molten metal includes a pocket of the molten metal, and the transverse flow of the molten metal relative to the ribbon of glass carries the contaminants or dross on the surface of the molten metal into the pocket where it is removed from the surface of the molten metal. When the bath of molten metal is very wide, the movement of the contaminants into the pocket of molten metal may be assisted, for example by blowing or brushing the dross into the pocket where it is removed from the molten metal. Alternatively a roller made of any suitable material, for example stainless steel, and carrying axial vanes may be positioned with its axis parallel to the direction of advance of the ribbon of glass on the bath and rotated slowly so that the dross is assisted into the pocket where it is retained and removed, for example by an operator with appropriate mechanical means.

Preferably the flat glass in ribbon form manufactured in accordance with the present invention has a polished surface.

The invention also comprises apparatus for manufacturing flat glass including a tank structure containing a bath of molten metal, means for delivering glass to the bath through an inlet to the bath and for advancing the glass along the bath in ribbon form for delivery through an outlet from the bath, at least one circulation duct for molten metal whose inlet and outlet communicate with the bath through the tank structure, in the region of the tank where the ribbon is sufficiently stiff to hold its shape, the outlet of the duct communicating with the bath through the tank floor so that the duct forms a loop, and means for pumping molten metal through said loop so that it wells up to the surface of the bath underneath the ribbon of glass and then moves under the ribbon, thereby presenting a continuously renewed molten metal surface to the underface of the ribbon of glass.

Preferably the means for pumping molten metal causes the molten metal which wells to the surface of the bath underneath the ribbon of glass to move under the ribbon of glass transversely to the direction of movement of the ribbon.

In order that the underface of the ribbon of glass is in contact with a continuously renewed molten metal surface as the ribbon leaves the surface of the bath, a preferred embodiment of the invention includes at least one circulation duct whose outlet passes through the tank floor underneath the region of the bath where the ribbon of glass leaves the surface of the bath.

In order that the invention may be more clearly understood an embodiment thereof will now be described, by way of example, with reference to the accompanying drawings in which:

FIGURE 1 is a sectional elevation of apparatus according to the invention comprising a tank structure containing a bath of molten metal, a roof structure over the tank structure and apparatus for delivering a rolled ribbon of glass at a controlled rate on to the bath surface, and FIGURE 2 is a section on line II—II of FIGURE 1.

Referring to the drawings, a forehearth of a continuous glass melting furnace is indicated at 1, a regulating tweel at 2 and a spout at 3. The spout 3 comprises a lip 4 and side jambs 5 which form with the lip a spout of generally rectangular cross-section. A cover is secured over the spout 3 in well-known manner.

Operatively associated with the spout 3 are a pair of water-cooled casting rolls 6 and 7 which are mounted in side frames 8 and are driven through toothed wheels by power means, not shown.

A gate 10 is adjustably supported in a vertical plane in continuity with the upper casting roll 6. The gate 10 shields the roll 6 from heat radiated from the molten glass 11 flowing from the forehearth 1 over the lip 4 of the spout 3 to pass between the casting rolls 6 and 7.

The upper casting roll 6 is disposed slightly in advance of the lower casting roll 7 so that the molten glass 11 flows from the lip 5 on to the upper part of the roll 7 which thus presents to the glass 11 a downwardly and forwardly directed arcuate casting bed moving in the same direction as the direction of flow of the glass 11 along the spout. Thus the molten glass 11 on leaving the spout 3 is constrained to flow forwardly thereby preventing backward flow of molten glass under the spout 3.

The ribbon forming means comprising casting rolls 6 and 7 just described is disposed over one end of a tank structure which contains a bath 12 of molten metal, for example, molten tin or a molten tin alloy in which tin predominates. The tank comprises a floor 13, side walls 14 and end walls 15. The side walls 14 and end walls 15 are integral with each other and with the floor 12. The level of the surface of the bath 12 of molten metal is indicated at 16.

The tank structure supports a roof structure bridging the bath and including a roof 17, end walls 18 and 19 and side walls 20, so that the roof structure provides a tunnel over the bath 12 and defines a headspace over the bath into which headspace a protective atmosphere is fed. The atmosphere is supplied into the headspace over the bath through ducts 20a connected to a header outside the roof structure, the ducts 20a extending downwardly through the roof 17.

The protective atmosphere is maintained at a plenum in the headspace over the bath so that there is an outward flow of protective atmosphere from the tunnel defined by the roof structure to prevent the ingress of ambient atmosphere.

The end wall 18 at the inlet end of the tank extends downwardly into the tank structure and defines an inlet 21 through which a formed ribbon of glass 22 is delivered by the casting rolls 6 and 7 on to the bath. The end wall 19 of the roof structure at the outlet end of the tank defines with the end wall 15 of the tank structure an outlet 23 through which a cooled ribbon of glass is taken unharmed from the bath.

At the inlet end of the bath an extension 24 of the roof is provided and forms with the gate 10 a chamber enclosing casting rolls 6 and 7, this chamber further comprising side walls 25 carried by the side walls 14 of the tank. Because a plenum of protective atmosphere is maintained in the headspace over the bath there is flow of protective atmosphere outwardly through the inlet 21 into the chamber which encloses the casting rolls as well as outwardly through the outlet 23.

In the embodiment of the invention described herein by way of example temperature regulators, shown as heaters 26, are mounted in the roof over the bath and further temperature regulators shown as heaters 27 are mounted in the bath. The temperature gradient down the bath is so regulated that the ribbon of glass leaving the bath through the outlet has flat parallel surfaces which have a lustre of a fire finish quality. These characteristics of the glass leaving the bath are achieved either by superficial melting of the surfaces of the glass as it is advanced along the bath or by maintaining the temperature of the bath at the inlet end of at least about 1,000° C. (for soda-lime-silica glass) so that a molten layer 28 of glass is formed from the ribbon 22, this layer being maintained molten for a sufficient distance down the bath to permit the development of a buoyant body 30 of molten glass. The buoyant body 30 of molten glass is continually advanced in ribbon form along the bath and is cooled as it is advanced until at the outlet end of the bath where the temperature is about 600° C. the ribbon can be taken unharmed from the bath by driven rollers 37 disposed at the outlet end of the tank and slightly above the level of the bottom of the outlet 23 from the bath.

Despite the pressure plenum of protective atmosphere which is maintained in the headspace over the bath, some slight traces of oxygen and sulphur, for example, find their way into the headspace over the bath. The presence of oxygen and sulphur in the headspace may lead to reactions with the metal of the bath which produce in the bath contaminants for the glass which may become incorporated in or on the underface of the glass. Contaminants may also be formed at the bath surface when traces of oxygen and sulphur enter the bath from the underface of the ribbon of glass, and for some subsequent uses of the glass it has previously been advantageous to clean the underface of the ribbon after it has left the bath. According to the invention means are provided for maintaining a circulation of the bath metal to cause a continuous movement of molten metal away from the underface of the ribbon of glass. This is effected by causing the molten metal of the bath to well upwardly to the surface 16 of the bath underneath the ribbon of glass so that a continuously renewed molten metal surface is presented to the glass.

As shown in FIGURE 1 a circulation duct 31 for molten metal is connected to an outlet port 32 from the bath extending through the side wall 14 of the tank structure. The other end of the duct 31 is connected to an inlet port 33 to the bath which extends upwardly through the floor 13 of the tank structure underneath the central area of the advancing ribbon of glass 36. The duct is thus in the form of a loop connected with the bath through the tank floor, and pumping means 34 is provided in the loop for pumping molten metal from the side of the bath and through the duct so that the molten metal is applied to the bath through the inlet port 33 and wells up to the bath surface underneath the ribbon of glass.

This welling-up of the molten metal is indicated by the arrows 35 in FIGURE 2 which shows two circulation ducts mounted in the same vertical plane of the bath, each duct being connected to an outlet port through a side wall of the tank and to an inlet port through the tank floor underneath the ribbon of glass.

Molten metal pumped through each inlet port 33 moves back to the associated outlet port 32 in a direction transversely to the direction of movement of the ribbon so that there is sustained a continuous transverse current of molten metal across and underneath the ribbon surface which circulation prevents contaminants from contacting or remaining in contact with the underface of the ribbon in the region where the glass ribbon is removed from the bath, and particularly at the line of take-off of the ribbon. The molten metal surface underneath the ribbon is thus continually removed and a clean metal surface continuously presented to the glass ribbon in this region. Circulation ducts for the molten metal according to the invention are incorporated in the tank structure in those regions where the ribbon of glass is sufficiently stiff to hold its form so that the form of the ribbon of glass will not be affected by the circulation of molten metal, and it has been found advantageous to incorporate circulation ducts at least in the region of the bath where the ribbon of glass leaves the surface of the bath so that the underface of the ribbon is supported on the continuously renewed molten metal surface as the ribbon leaves the surface of the bath. FIGURE 2 is a section through the tank structure in this region showing two circulation ducts, one at each side of the tank structure providing a continuously renewed molten metal surface for supporting the whole of the underface of the ribbon of glass just before it leaves the molten bath.

The pumping means in each circulation loop can be of any suitable kind for pumping molten metal, and may, for example, take the form of an electromagnetic pump in which electric current is passed through the molten metal in a length of the duct and a magnetic field is applied to the metal axially of the duct by means of a coil around the duct so that the molten metal is caused to flow forwardly through the duct by the well-known motor principle. Alternatively an inductor heater may be used to pump the molten metal in the loop, and in this case an induction coil is located at the bottom of the loop.

The continuous movement of the molten metal ensures that a clean surface is presented to the glass ribbon by the bath as the ribbon leaves the surface of the bath.

Instead of regulating the delivery of glass to the bath by feeding a ribbon of glass of predetermined dimensions to the bath at a controlled rate, glass in molten form may be supplied direct to the bath from the spout 3 of the forehearth 1. The gate 10 in this construction controls the rate at which molten glass is delivered to the bath 10 to form the layer or buoyant body 30 of molten glass.

As an alternative to the arrangement shown in the drawings, both arms of the circulation loop 31 may communicate with the bath through the floor of the tank structure.

Glass produced by the method according to the present invention has all the advantages of a fire finish quality and freedom from distortions such as occur in the known rolling or drawing methods, and in addition there is no necessity for cleaning the underface of the ribbon before further use.

The invention also comprehends flat glass produced by method according to the invention and sheets of glass cut therefrom.

I claim:

1. A method of manufacturing flat glass in ribbon form on a bath of molten metal, wherein glass in ribbon form is advanced along the bath of molten metal, characterised by the steps of applying molten metal to the bath to flow upwardly beneath the central area of the ribbon of glass, withdrawing molten metal from the bath in a direction transversely of the zone of application of molten metal to the bath, and controlling the rate of applying and the rate of withdrawal of the molten metal such that a transverse current of molten metal is sustained directly beneath the advancing ribbon of glass.

2. A method according to claim 1 characterised by applying molten metal to the bath to flow upwardly beneath the central area of the ribbon of glass in the region where the ribbon of glass is taken off the bath surface for discharge through an outlet from the bath.

3. A method of manufacturing flat glass in ribbon form on a bath of molten metal, wherein glass in ribbon form is advanced along the bath of molten metal, characterised by the steps of applying molten metal to the bath to flow upwardly beneath the central area of the ribbon of glass in the region where the ribbon of glass is taken up from the bath surface, withdrawing molten metal from the bath in a direction transversely of the zone of application of molten metal to the bath, controlling the rate of applying and the rate of withdrawal of the molten metal such that a transverse current of molten metal is sustained directly beneath the glass so as to move from under the ribbon any contaminants for the glass, and continuously removing from the bath contaminants which are moved from beneath the ribbon by said transverse current.

4. Apparatus for manufacturing flat glass including a tank structure containing a bath of molten metal, means for delivering glass to the bath through an inlet to the bath and for advancing the glass along the bath in ribbon form for delivery through an outlet for the glass from the bath, and molten metal recirculation apparatus connected to inlet and outlet ports positioned within the tank structure such that they are transverse of each other relative to the tank structure with the inlet port beneath the central area of the glass ribbon being advanced.

5. Apparatus according to claim 4, wherein the molten metal recirculation apparatus comprises at least one circulation duct connected to said inlet and outlet ports, and pumping means associated with the duct for recirculating molten metal from the outlet to the inlet port.

6. Apparatus according to claim 4, wherein the inlet and outlet ports are positioned within the region of the tank structure where the ribbon of glass is taken off the bath surface for discharge through said outlet for the glass from the bath.

References Cited by the Examiner

UNITED STATES PATENTS

| | | | |
|---|---|---|---|
| 1,920,118 | 7/1933 | Walsh et al. | 65—182 X |
| 2,298,348 | 10/1942 | Coxe | 65—182 X |
| 3,218,141 | 11/1965 | Lambert | 65—83 X |

FOREIGN PATENTS 1,323,711    3/1963    France.

DONALL H. SYLVESTER, *Primary Examiner.*

A. D. KELLOGG, *Assistant Examiner.*